United States Patent
Nakon et al.

(10) Patent No.: US 8,771,619 B2
(45) Date of Patent: Jul. 8, 2014

(54) METHOD FOR TREATING ARSENIC CONTAINING MATERIALS

(75) Inventors: David Nakon, Richlands (AU); David Michael Way, Kenmore (AU)

(73) Assignee: Xstrata Queensland Limited, Brisbane (AU)

( * ) Notice: Subject to any disclaimer, the term of this patent is extended or adjusted under 35 U.S.C. 154(b) by 0 days.

(21) Appl. No.: 13/880,347

(22) PCT Filed: Oct. 19, 2011

(86) PCT No.: PCT/AU2011/001329
§ 371 (c)(1),
(2), (4) Date: Aug. 9, 2013

(87) PCT Pub. No.: WO2012/051652
PCT Pub. Date: Apr. 26, 2012

(65) Prior Publication Data
US 2014/0017152 A1 Jan. 16, 2014

(30) Foreign Application Priority Data
Oct. 20, 2010 (AU) .............................. 2010904681

(51) Int. Cl.
*C01G 28/00* (2006.01)
(52) U.S. Cl.
USPC .............. 423/87; 423/27; 423/561.1; 423/48; 423/566

(58) Field of Classification Search
USPC .......................................................... 423/87
See application file for complete search history.

(56) References Cited

U.S. PATENT DOCUMENTS

| 3,248,212 A | 4/1966 | Mellgren et al. |
| 3,911,078 A | 10/1975 | Nadkarni et al. |
| 5,290,338 A | 3/1994 | Anderson et al. |

FOREIGN PATENT DOCUMENTS

| PH | 10053 | 7/1976 |
| PH | 11105 | 10/1977 |
| WO | WO 94/09165 A1 | 4/1994 |
| WO | WO2009/135291 A1 | 11/2009 |

OTHER PUBLICATIONS

International Search Report and Written Opinion, PCT/AU2011/000139, mailed Nov. 24, 2011.

*Primary Examiner* — Melissa Stalder
(74) *Attorney, Agent, or Firm* — Winston & Strawn LLP

(57) ABSTRACT

A method for selectively removing arsenic from a sulphide material containing arsenic by conducting a leaching step that includes contacting the material with a leaching solution that leaches arsenic from the material to form a pregnant liquor containing dissolved arsenic and a solid of a sulphide material of reduced arsenic content, and subsequently separating the solid from the pregnant liquor. The fresh leaching solution that is provided to the leaching step is an alkaline solution having a sulphide-containing compound present in an amount of from 0 to 1.0 times the amount of sulphur containing compound required to react with the arsenic present in the material.

19 Claims, 2 Drawing Sheets

METHOD FOR TREATING ARSENIC CONTAINING MATERIALS

FIELD OF THE INVENTION

The present invention relates to a method for treating arsenic containing materials, especially solid sulphide materials that contain arsenic. The method may be used to treat ores, concentrates, tailing, slags, condensed fumes and the like.

BACKGROUND TO THE INVENTION

Arsenic is a toxic heavy metal that is now subject to stringent environmental limits. Unfortunately, arsenic is found in many minerals, ore bodies, concentrates and other materials that also contain other valuable components. For example, enargite is a copper sulphide that is increasingly found in ores and concentrates that contains appreciable quantities of arsenic, for example, between 20 and 25% by weight, of arsenic. Speiss, which is formed during smelting of lead and other metals, can also contain appreciable quantities of arsenic.

It is frequently desirable to treat such solid materials to recover the valuable components. However, the treatment of such materials must take into account the arsenic content of those materials. Conventional treatment of such arsenic-containing materials by smelting can result in the emission of volatile arsenic, causing significant occupational health and safety issues, as well as causing concerns from an environmental viewpoint.

One method for treating such arsenic containing materials involves subjecting the material to a leaching step to selectively remove arsenic from the material. A solid/liquid separation step is then utilised to separate a pregnant liquor containing dissolved arsenic from the solid material. The solid material recovered from this leaching process has a reduced arsenic content. Desirably, other toxic heavy metals, such as antimony and bismuth, may also be removed from the solid material during the leaching process. Following this treatment, the materials having reduced arsenic content can then be treated to recover the other valuable components, for example, by pyrometallurgical or hydrometallurgical processes.

Existing processes for removing arsenic from sulphide containing materials typically involve leaching the materials with an alkaline solution that contains sodium sulphide ($Na_2S$). This solution typically includes sodium hydroxide (NaOH) and sodium sulphide ($Na_2S$). For example, in the treatment of enargite (a copper mineral generally accepted to contain $Cu_3AsS_4$), the following reaction is reported in literature:

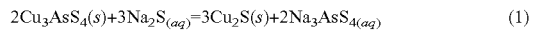

$$2Cu_3AsS_4(s) + 3Na_2S_{(aq)} = 3Cu_2S(s) + 2Na_3AsS_{4(aq)} \quad (1)$$

Any orpiment ($As_2S_3$, a common monoclinic arsenic sulfide mineral) that may be present reacts with the sodium sulphide according to the following equation reported in literature (2):

$$3Na_2S_{(aq)} + As_2S_3 = 2Na_3AsS_{3(aq)} \quad (2)$$

The above equations show that the stoichiometric amount of $Na_2S$ required to fully remove all the arsenic present is 1.5 times the number of moles of arsenic present. In practice, commercial processes utilise an amount of $Na_2S$ that provides a mole ratio of sulphide to arsenic typically the range of 6 to 12. It has been found that arsenic removal is quite slow if an approximately stoichiometric amount of $Na_2S$ is used.

U.S. Pat. No. 3,911,078 describes a process for removing arsenic and antimony from copper sulphide containing materials. This patent describes the use of leaching solutions containing sodium hydroxide and sodium sulphide. The patent states that it is preferable in leaching to use about 2 to 3 times the stoichiometric quantity of sodium sulphide, or about 3 to 4.5 moles of $Na_2S$ for every mole of arsenic and every mole of antimony present. The patent further states that the presence of this excess $Na_2S$ assures essentially complete removal of the arsenic and antimony. Of course, the requirement to use in excess of $Na_2S$ incurs increased operational costs due to the requirement to purchase increased amounts of $Na_2S$ to feed to the leaching process.

As mentioned above, most alkaline sulphide leaching processes for removing arsenic from sulphide containing materials use a sulphide $S^{2-}$/As molar ratio that is well above the stoichiometric requirement of $S^{2-}$/As=1.5. Typically, a molar ratio of $S^{2-}$/As of between 6 and 12 is used to achieve arsenic removal of over 90%. Generally, the processing conditions used in known alkaline sulphide leaching processes include temperatures in the range of 80 to 95° C., slurry densities from 10 to 50% w/w and a molar ratio of $S^{2-}$/As of between 6 and 12.

BRIEF DESCRIPTION OF THE INVENTION

It has now been surprisingly found that effective removal of arsenic from sulphide containing materials can be achieved using lower molar ratios of $S^{2-}$/As.

In one aspect, the present invention provides a method for selectively removing arsenic from a sulphide material containing arsenic, the method comprising the steps of conducting a leaching step comprising contacting the material with a leaching solution that leaches arsenic from the material to form a pregnant liquor containing dissolved arsenic and a solid comprising material of reduced arsenic content, and subsequently separating the solid from the pregnant liquor, wherein a fresh leaching solution that is provided to the leaching step comprises an alkaline solution having a sulphide-containing compound present in an amount of from 0 to 1.0 times the amount of sulphur containing compound required to react with the arsenic present in the material.

Throughout this specification (including the claims) the term "the amount of sulphur containing compound required to react with the arsenic present in the material" is determined in accordance with equations (1) or (2).

In one embodiment, a recycle solution or a fresh leaching solution is provided to the leaching step. In some embodiments, the recycle solution or fresh leaching solution may have a sulphide-containing compound present in an amount of from 0 to 1.0 times the amount of sulphur containing compound required to react with the arsenic present in the material.

In one embodiment, the amount of sulphide containing compound present in the fresh leaching solution or recycle solution is a sub-stoichiometric amount of the sulphide containing compound (based upon the amount of arsenic to be leached from the material in accordance with Reaction 1 or 2 above). In some embodiments, the amount of sulphide containing compounds present in the fresh leaching solution or recycle solution results in a molar ratio of $S^{2-}$/As of from 0 to 1.5, more preferably 0 to 1.2, even more preferably 0 to 1, being obtained.

In some embodiments, the fresh leach solution contains no sulphide compounds.

In some embodiments, the sulphide containing compound may be selected from $Na_2S$, or other sulphides. Alternatively, the sulphide compound(s) may be generated in the solution by adding other sulphur-containing compounds, such as NaSH or S (elemental sulphur) to the solution. In some embodiments, the sulphur containing compound may comprise a sulphur compound that also includes sodium. The sulphur containing compound may desirably be sodium sulphide ($Na_2S$), which can be provided in anhydrous or hydrated forms.

In some embodiments, the fresh leaching solution provided to the contacting step has at least 8 moles, more preferably at least 16 moles of alkaline material (calculated as equivalent $OH^-$) for each mole of As present in the solid.

In some embodiments, the alkaline material present in the leaching solution comprises a sodium-based alkaline material. The sodium-based alkaline material may comprise sodium hydroxide. It will be appreciated that other alkaline materials may also be used in the leaching solution. For example, sodium carbonate may be used in the leaching liquor, or indeed, any other soluble or partly soluble or even sparingly soluble alkaline material may be used. It is also possible that alkalis of other alkali earth metals, such as potassium, could also be used in embodiments of the present invention. Indeed, the present invention may encompass the use of a wide range of alkali materials. Some examples of other alkali materials that may be used include potassium hydroxide, sodium carbonate, lime or quicklime, or caustic magnesia.

In some embodiments, the fresh leaching solution includes sodium hydroxide. The fresh leaching solution may have a sodium hydroxide content in the range of 1.75 moles to 6.25 moles per liter. In some embodiments, the fresh leaching solution may have at least 8 moles, more preferably at least 16 moles of sodium hydroxide for each mole of As present in the solid.

In some embodiments, the fresh leaching solution comprises a sodium hydroxide solution having sulphide present in an amount of from 0 to 1.0 times the amount of sulphide required to react with the arsenic present in the material.

The temperature utilised for the leaching step may range from 30° C. up to the boiling point of the solution or slurry. Preferably, the temperature falls for the range of 30 to 115° C., more preferably in the range of 80 to 115° C. The leaching step may be conducted at atmospheric pressure. However, in some embodiments, it may be possible to conduct the leaching step in a pressure vessel. In these embodiments, the pressure utilised in the leaching step may be above atmospheric pressure and the temperature utilised in the leaching step may be above 100° C.

The slurry of solid material and leaching liquor formed in the leaching step may have a solid content in the range of 5 to 90% w/w, preferably 5 to 60% w/w, more preferably 30 to 55% w/w.

The method of the present invention may be used to treat all sulphide materials that also contain arsenic. This includes all arsenic bearing minerals, ores, intermediates, slags, mattes, condensed fumes and the like. The method of the present invention is particularly suitable for treating arsenic bearing sulphide minerals, ores and concentrates. The method of the present invention can be used to successfully remove arsenic from copper sulphide containing minerals, ores, and concentrates.

The method of the present invention may be used to treat sulphide materials that also contain antimony. Indeed, many arsenic-containing sulphide materials also contain antimony and the present invention allows for reducing the level of both arsenic and antimony in such materials.

The present inventors have surprisingly found that using a reduced amount of sulphide containing material in the fresh leach solution provided to the leaching step can still result in removal of sufficient arsenic to meet environmental requirements and/or downstream processing requirements. The present invention also reduces the operating costs of the process, as these costs are typically very dependent on the amount of sulphide containing material (or sulphur-containing material that is added to generate sulphide in solution) that has to be added to the leaching liquor. The most common sulphide containing material used in industrially applied processes is $Na_2S$ and the operating costs of such processes are very dependent on the amount of $Na_2S$ that has to be added to the leaching circuit.

Any solid/liquid separation process known to the person skilled in the art may be used to separate the solid residue (having a reduced or depleted arsenic content) from the pregnant liquor. The particular selection of the solid/liquid separation process is not critical to successful operation of the present invention. The person skilled in the art will understand that suitable solid/liquid separation processes that may be used in the present invention include filtration, sedimentation, clarification, thickening, centrifugation, dewatering, decanting, and the like.

Once the solid residue has been separated from the pregnant leach liquor, the solid residue may be subjected to an optional washing step to remove alkaline solution therefrom. The solid residue (which will typically contain valuable components and will have a reduced arsenic content) may then be sent to storage or sent to processing for recovery of the valuable components therefrom. For example, if the sulphide material being treated comprises a copper sulphide ore or concentrate, the solid residue will contain copper sulphide and the residue may be treated to recover copper therefrom; for example, by smelting or by hydrometallurgical processes.

The pregnant liquor that is separated from the solid residue after the leaching step may be treated to remove arsenic therefrom. The person skilled in the art will appreciate that the pregnant liquor, which contains dissolved arsenic, may be treated in a number of ways to remove the arsenic therefrom. For example, the pregnant liquor may be passed to a crystallisation, ion exchange, solvent extraction or precipitation process to a form an arsenic compound. Crystallisation or precipitation of arsenic may occur by reducing the pH of the pregnant liquor until arsenic compounds precipitate, and may be facilitated by the addition of other metal ions, such as ferric iron. Alternatively, the pregnant liquor may be cooled to induce precipitation of arsenic compounds. The precipitated arsenic compounds may be separated from the liquor. The liquor may be at least partly recycled to the leaching step.

Similarly, if the pregnant leach liquor contains dissolved antimony, the pregnant leach liquor may be treated by any known process for removing antimony from solution.

The liquor may be further treated to regenerate alkaline material, using processes known to the person skilled in the art.

The leaching step used in the method of the present invention may utilise a single leaching step, or it may utilise a plurality of leaching steps. The leaching steps may comprise co-current leaching steps, counter current leaching steps or cross current leaching steps.

The leaching process may comprise an open circuit leaching process, or it may comprise a leaching circuit that includes leach liquor recycling.

In a second aspect, the present invention provides a method for selectively removing arsenic from a sulphide material containing arsenic, the method comprising the steps of conducting a leaching step comprising contacting the material with a fresh leaching solution that leaches arsenic from the material to form a leach solution containing dissolved arsenic and a solid comprising material of reduced arsenic content, the fresh leaching solution that is provided to the leaching step comprising an alkaline solution having a sulphide-containing compound present in an amount of from 0 to 1.0 times the amount of sulphur containing compound required to react with the arsenic present in the material, separating the solid from the leach solution, and recycling at least part of the leach solution to the leaching step.

Suitably, the leach solution that is recycled to the leaching step contains one or more dissolved sulphide-containing compounds. The one or more dissolved sulphide-containing compounds may be present in the leach solution that is recycled to the leaching step in an amount of from 0 to 1.0 times the amount of sulphur containing compound required to react with the arsenic present in the material.

In other embodiments, the one or more dissolved sulphide-containing compounds may be present in the leach solution that is recycled to the leaching step in an amount of less than 1.0 times the amount of sulphur containing compound required to react with the arsenic present in the material.

The present inventors have surprisingly found that contacting a sulphide material containing arsenic with a fresh leaching solution that has a sulphide-containing compound present in an amount of from 0 to 1.0 times the amount of sulphur containing compound required to react with the arsenic present in the material can not only dissolve arsenic, but it can also generate one or more dissolved sulphide containing compounds in the leach solution. Recycling at least part of the leach solution back to the leaching step results in dissolved sulphide compounds being present in the recycle solution returned to the leaching step, which is believed to enhance the kinetics of leaching of the arsenic.

In some embodiments, the fresh leaching solution that is fed to the leaching step contains no sulphide containing compounds.

In some embodiments of the second aspect of the present invention, the method is conducted as a continuous method. In this method, a fresh leaching solution is initially charged to the leaching step. Leaching solution is removed from the leaching step and part of the leaching solution is returned as a recycle stream to the leaching step. Solids removal from the leaching step will typically occur at the same rate as the rate of feed of solids to the leaching step. Addition of fresh leaching solution normally occurs such that the chemical requirements of the leaching step are met by the combined in-flow of fresh leaching solution and recycled leach solution.

In some embodiments, up to 80% of the leach solution is recycled to the leaching step. In other embodiments, up to 60%, or even up to 50%, or even up to 40%, or even up to 30%, of the leach solution is recycled leaching step.

The method of the second aspect of the present invention may also remove antimony if the solid material also contained antimony.

The present inventors also believe that the leaching process of the present invention can be used to remove or recover antimony from solid sulphide materials that contain antimony. Accordingly, in a third aspect, the present invention provides a method for selectively removing antimony from a sulphide material containing antimony, the method comprising the steps of conducting a leaching step comprising contacting the material with a leaching solution that leaches antimony from the material to form a pregnant liquor containing dissolved antimony and a solid comprising material of reduced antimony content, and subsequently separating the solid from the pregnant liquor, wherein a fresh leaching solution that is provided to the leaching step comprises an alkaline solution having a sulphide-containing compound present in an amount of from 0 to 1.0 times the amount of sulphur containing compound required to react with the antimony present in the material.

In a fourth aspect, the present invention provides a method for selectively removing antimony from a sulphide material containing antimony, the method comprising the steps of conducting a leaching step comprising contacting the material with a fresh leaching solution that leaches antimony from the material to form a leach solution containing dissolved antimony and a solid comprising material of reduced antimony content, the fresh leaching solution that is provided to the leaching step comprising an alkaline solution having a sulphide-containing compound present in an amount of from 0 to 1.0 times the amount of sulphur containing compound required to react with the antimony present in the material, separating the solid from the pregnant liquor, and recycling at least part of the leach solution to the leaching step.

DETAILED DESCRIPTION OF THE DRAWINGS

It will be appreciated that the drawings have been provided for the purposes of illustrating preferred embodiments of the present invention. Therefore, it will be understood that the present invention should not be considered to be limited solely to the features as shown in the attached drawings.

Figure 1:
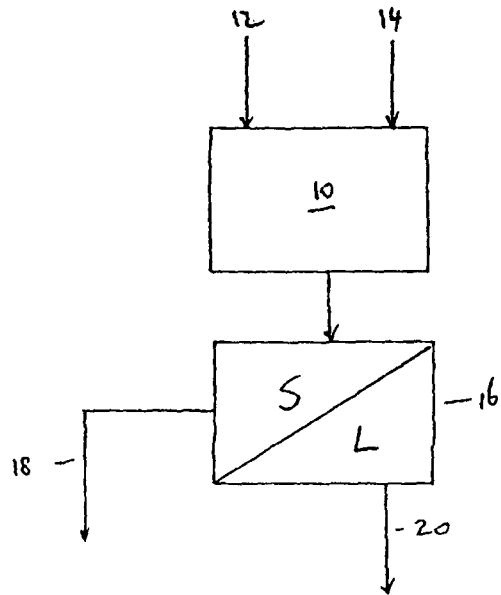
FIG. 1 shows a process flow diagram showing a flowsheet suitable for use in an embodiment of the present invention.

FIG. 1 shows a process flow sheet suitable for use in one embodiment of the present invention. In the process flow sheet shown in FIG. 1, a leaching step 10 is conducted. A feed 12 of solid sulphide containing material, such as an enargite ore or concentrate, is fed to the leaching step 10. A leaching solution 14, that comprises a solution containing NaOH and $Na_2S$, is also fed to the leaching step 10. The leaching solution 14 contains $Na_2S$ that is present in an amount of from 0 to 1.0 times the amount of $Na_2S$ that would be required to fully react with the arsenic present in the solid sulphide containing material that is fed to the leaching step 10. This results in a molar ratio of $S^{2-}/As$ falling within the range of 0 to 1.5.

After allowing for the desired residence time in the leaching step, which will typically fall within the range of 1 to 10 hours, the slurry from leaching step 10 is passed to a solid/liquid separation step 16. Solid/liquid separation step 16 may comprise any suitable known unit operation to separate solids and liquids. Examples include filtration, thickening and clarification.

The solid separated in step 16 are fed via line 18 to further treatment and/or storage. The liquid separated in step 16, which comprises a pregnant liquor containing dissolved arsenic, is fed via line 20 to liquid processing steps which are used to remove arsenic.

The process flow sheet shown in FIG. 1 comprises an open circuit leaching flowsheet. The leaching liquor supplied via line 14 will comprise a fresh leaching liquor.

Figure 2:
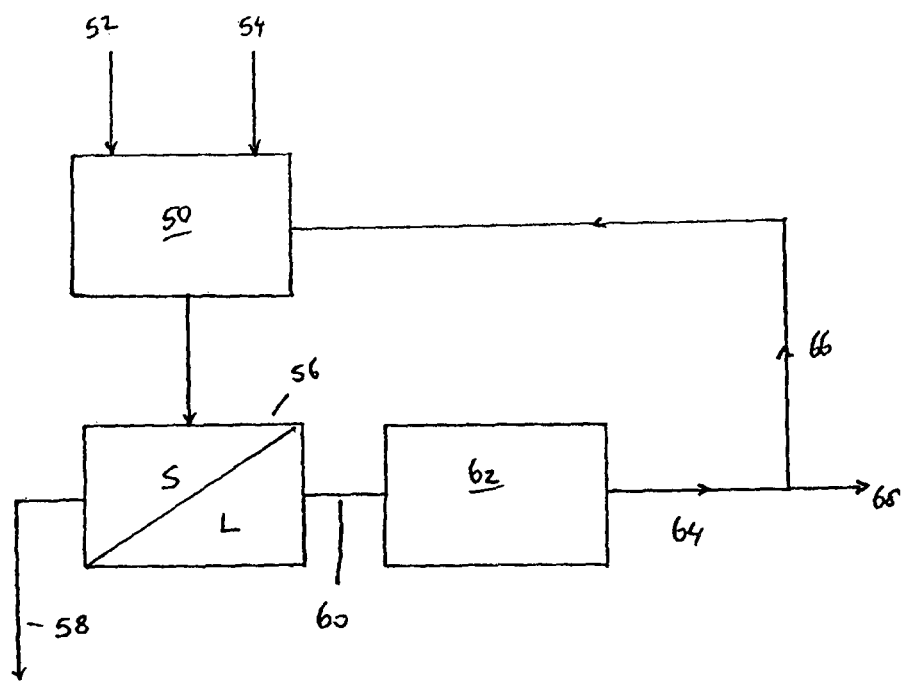
FIG. 2 shows a process flow diagram showing a flowsheet suitable for use in another embodiment of the present invention.

FIG. 2 shows an alternative flowsheet for use in another embodiment of the present invention. In the embodiment shown in FIG. 2, the leaching step is carried out in leaching vessel 50. A feed 52 of solid sulphide material containing arsenic is supplied to leaching vessel 50. Fresh leach solution is supplied to the leaching vessel via line 54. The fresh leaching solution comprises an alkaline solution containing no $Na_2S$ or containing $Na_2S$ that is present in an amount of from 0 to 1.0 times the amount of $Na_2S$ that would be required to fully react (in accordance with reactions (1) or (2)) with the arsenic present in the solid sulphide containing material that is fed to the leaching vessel 50.

After allowing for the desired residence time in the leaching step, the slurry from leaching vessel 50 is transferred to solid/liquid separation process 56. The solids leave the solid/liquid separation process 56 via line 58. The liquid that is separated from the slurry in step 56 is transferred via line 60 to an arsenic removal step 62 in which arsenic is removed from solution. The cleaned liquor 64 is partly recycled via line 66 to the leaching vessel 50. The remainder of the cleaned liquor is transferred via line 68 to final treatment or storage.

The process flow sheet shown in FIG. 2 incorporates a recycle line 66 for recycling liquor back to the leaching step 50. This has the potential to reduce the amount of fresh leaching liquor that needs to be supplied via line 54 to the leaching step 50.

Figure 3:
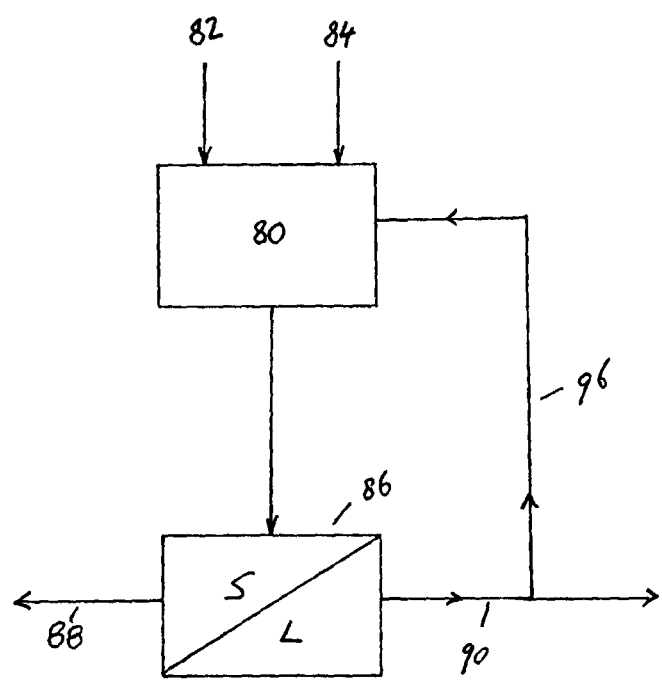
FIG. 3 shows a process flow diagram showing a flowsheet suitable for use in another embodiment of the present invention.

FIG. 3 shows another alternative flow sheet that also uses recycle of the leach solution. In the embodiment shown in FIG. 3, the leaching step is carried out in leaching vessel 80. A feed 82 of solid sulphide material containing arsenic is supplied to leaching vessel 80. Fresh leach solution is supplied to the leaching vessel via line 84. The fresh leaching solution comprises an alkaline solution containing no $Na_2S$ or containing $Na_2S$ that is present in an amount of from 0 to 1.0 times the amount of $Na_2S$ that would be required to fully react with the arsenic present in the solid sulphide containing material that is fed to the leaching vessel 80.

After allowing for the desired residence time in the leaching step, the slurry from leaching vessel 80 is transferred to solid/liquid separation process 86. The solids leave the solid/liquid separation process 86 via line 88. The liquid that is separated from the slurry in step 86 is removed via line 90. Part of the liquid or leach solution in line 90 is recycled via line 96 to the leaching vessel 80. The remainder of the leach solution in line 90 is sent to cleaning, arsenic removal, or disposal.

In some embodiments shown in FIGS. 2 and 3, the fresh leaching solution may comprise an alkaline solution, such as a caustic soda solution, that has no sodium sulphide present. The present inventors have surprisingly found that the fresh leaching solution can generate dissolved sulphide compounds when it leaches or reacts with the solid material. Therefore, the recycled leaching solution that is returned to the leaching step (50 or 80) will contain dissolved sulphide compounds. The present inventors believe that this will advantageously improve the kinetics of arsenic and antimony removal in the leaching step.

The person skilled in the art will appreciate that the leach liquor that is recovered from solid/liquid separation step 56 may be subjected to other treatments to recover alkalinity or recover sulphide material for recycle to the leaching step 50, or for reuse in other processes or for recovery and sale as a valuable commodity in its own right. The person skilled in the art will readily appreciate that a number of different known processes may be used to so treat the liquor.

EXAMPLES

In order to demonstrate an embodiment of the present invention, several experimental tests were conducted at a laboratory scale. Table 1 summarises the results of those tests, including the reaction conditions that were used in the leaching step and the removal of arsenic from the solids material fed to the leaching step. In table 1, test number 2 is the experimental test that falls within the scope of the present invention. Indeed, in test number 2, the starting leach solution contained zero $Na_2S$ and yet an 87% removal of arsenic from the solid sulphide material fed to the leaching step was obtained.

TABLE 1

| | | Test No | | |
|---|---|---|---|---|
| | | 1 | 2 | 3 |
| Solids | | | | |
| Slurry Density | gpl | 25 | 25 | 50 |
| Starting solids | grams | 250 | 250 | 500 |
| Starting arsenic | % w/w | 1.38 | 1.38 | 1.38 |
| Starting arsenic | grams | 3.45 | 3.45 | 6.9 |
| Starting arsenic | moles | 0.046 | 0.046 | 0.092 |
| Final Arsenic | % w/w | 0.052 | 0.18 | 0.09 |
| Arsenic Removal | | 96 | 87 | 94 |
| Solution | | | | |
| Volume | ml | 1000 | 1000 | 1000 |
| $Na_2S$ | gpl | 12 | 0 | 24 |
| NaOH | gpl | 226 | 226 | 226 |
| Starting sulphide | moles | 0.154 | 0 | 0.308 |
| Molar Ratio | | 3.3 | 0 | 3.3 |

A further series of examples were conducted using an open circuit flowsheet, in which there was no recycle of leach solution to the leaching step. The results are shown in Table 2.

TABLE 2

| | | Test No | | |
|---|---|---|---|---|
| | Units | 4 | 5 | 6 |
| Residence Time | hours | 20 | 24 | 24 |
| Solids | | | | |
| Slurry Density | % w/w | 25 | 50 | 50 |
| Starting Solids | grams | 661 | 188 | 1800 |
| Starting Antimony | % w/w | 0.11 | | |
| Starting Antimony | moles | 0.006 | | |
| Final Antimony | % w/w | 0.027 | | |
| Antimony Removal | % w/w | 96.3 | | |
| Starting Arsenic | % w/w | 1.38 | 3.15 | 0.83 |
| Starting Arsenic | grams | 9.11 | 5.92 | 14.86 |
| Starting Arsenic | moles | 0.12 | 0.08 | 0.20 |
| Final Arsenic | % w/w | 0.18 | 0.06 | 0.12 |
| Arsenic Removal | % w/w | 83 | 98 | 84 |
| Solution | | | | |
| Volume | ml | 1680 | 126 | 1460 |
| Starting $Na_2S$ | g/L | 0 | 0 | 0 |
| Starting NaOH | g/L | 226 | 220 | 220 |
| Starting Sulphide | moles | 0 | 0 | 0 |
| S:Sb Molar Ratio | | 0 | | |
| S:As Molar Ratio | | 0 | 0 | 0 |
| Kinetic Data - Arsenic in Residue | | | | |
| Time, hr | | | | |
| 0 | % w/w | 1.38 | 3.15 | 0.83 |
| 2 | % w/w | 1.00 | | |
| 4 | % w/w | | 0.19 | 0.16 |
| 8 | % w/w | 0.53 | 0.09 | 0.15 |
| 14 | % w/w | | 0.10 | |

TABLE 2-continued

|  | Units | Test No 4 | Test No 5 | Test No 6 |
|---|---|---|---|---|
| 14.5 | % w/w |  | 0.28 |  |
| 20 | % w/w |  | 0.18 |  |
| 24 | % w/w |  |  | 0.06 | 0.12 |
| Final PLS Composition |  |  |  |  |
| As | g/L |  | 3.8 |  |
| Na | g/L |  | 209 |  |
| Sb | mg/L |  | 267 |  |
| $S^{-2}$ | g/L |  | 1.8 |  |
| $SO_4^{-2}$ | g/L |  | 0.4 |  |
| NaOH | g/L |  | 187 |  |

Further examples were conducted using a closed circuit leaching flowsheet with leach solution recycle. The results are shown in Table 3.

TABLE 3

|  | Units | Test No 7 | Test No 8 |
|---|---|---|---|
| Residence Time | hours | 16 | 24 |
| Solids |  |  |  |
| Slurry Density | % w/w | 49 | 51 |
| Starting Solids | grams | 1433 | 1497 |
| Starting Antimony | % w/w | 0.10 | 0.06 |
| Starting Antimony | moles | 0.012 | 0.007 |
| Final Antimony | % w/w | 0.02 | 0.01 |
| Antimony Removal | % | 78 | 78 |
| Starting Arsenic | % w/w | 1.15 | 1.18 |
| Starting Arsenic | grams | 16.5 | 17.6 |
| Starting Arsenic | moles | 0.22 | 0.24 |
| Final Arsenic | % w/w | 0.07 | 0.09 |
| Arsenic Removal | % | 90 | 94 |
| Solution |  |  |  |
| Volume | ml | 1210 | 1210 |
| Fresh $Na_2S$ Added | g/L | 0 | 0 |
| Starting $Na_2S$ (Recycled Source) | g/L | 12 | 14 |
| Starting NaOH | g/L | 241 | 220 |
| Starting Sulphide ($S^{-2}$) | moles | 0.19 | 0.22 |
| $S^{2-}$:As Molar Ratio (Added) |  | 0 | 0 |
| $S^{2-}$:As Molar Ratio (Recycled Source) |  | 0.86 | 0.94 |
| $S^{2-}$:Sb Molar Ratio (Added) |  | 0 | 0 |
| $S2^-$:Sb Molar Ratio (Recycled Source) |  | 16.4 | 29.9 |
| Kinetic Arsenic in Residue Time, hr |  |  |  |
| 0 | % w/w | 1.15 | 1.18 |
| 8 | % w/w | 0.11 | 0.32 |
| 16 | % w/w | 0.07 | 0.14 |
| 24 | % w/w |  | 0.09 |
| Final PLS Composition |  |  |  |
| As | g/L |  | 18 |
| Na | g/L |  | 100 |
| Sb | g/L |  | 0.9 |
| $S^{-2}$ | g/L |  | 15 |
| NaOH | g/L |  | 120 |

Further test runs were carried out using an open circuit leaching flowsheet (with no recycle of leach solution). The results are shown in Table 4.

TABLE 4

| Test | # | 9 | 10 | 11 | 12 | 13 |
|---|---|---|---|---|---|---|
| Grind size, p80 | μm | 20 | N | N | N | N |
| Residence time | hr | 20 |  |  |  |  |
| SOLIDS |  |  | 50 | 50 | 50 | 50 |
| Slurry density | % w/w | 25 | 190 | 192 | 190 | 188 |
| Initial mass | g (dry) | 661 | 3.665 | 3.290 | 3.779 | 3.149 |
| Initial concentration of As | % w/w | 1.378 | 6.97 | 6.31 | 7.19 | 5.92 |
| Initial mass of As | g | 9.11 | 0.093 | 0.084 | 0.096 | 0.079 |
| Initial moles of As | mol | 0.122 | 167 | 162 | 163 | 160 |
| Final mass | g (dry) | 620 | 0.166 | 0.129 | 0.149 | 0.059 |
| Final concentration of As | % w/w | 0.181 | 0.28 | 0.21 | 0.24 | 0.09 |
| Final mass of As | g | 1.74 | 0.004 | 0.003 | 0.003 | 0.001 |
| Final moles of As | mol | 0.023 | 96.02 | 96.69 | 96.63 | 98.41 |
| ARSENIC REMOVAL | % | 80.90 | 91.53 | 92.01 | 92.02 | 97.84 |
| SOLUTION |  |  | 220 | 220 | 220 | 220 |
| Initial NaOH | g/L | 226 | 0 | 0 | 0 | 0 |
| Initial $Na_2S$ | g/L | 0 | 138 | 126 | 130 | 126 |
| Initial volume | mL | 1680 | 0 | 0 | 0 | 0 |
| Initial sulphide | g | 0.00 | 0 | 0 | 0 | 0 |
| Initial sulphide | mol | 0.000 | 0 | 0 | 0 | 0 |
| Molar ratio (S:As) |  | 0.0 |  |  |  |  |
| Kinetic As in solids | % w/w |  | 3.66 | 3.29 | 3.78 | 3.15 |
| 0 | hr | 1.38 |  |  |  |  |
| 2 | hr | 1.00 | 1.41 | 1.89 | 2.02 | 0.19 |
| 4 | hr |  | 1.23 | 1.01 | 0.81 | 0.09 |
| 8 | hr | 0.53 | 0.36 | 0.20 | 0.42 | 0.10 |
| 14 | hr | 0.28 |  |  |  |  |
| 20 | hr | 0.18 | 0.17 | 0.13 | 0.15 | 0.06 |
| 24 | hr |  |  |  |  |  |

| Test | # | 14 | 15 | 16 | 17 |
|---|---|---|---|---|---|
| Grind size, p80 | μm | N | 24 | 18 | 120 |
| Residence time | hr |  |  | 8 | 24 |
|  |  |  | 50 |  |  |

TABLE 4-continued

| | | | | | |
|---|---|---|---|---|---|
| SOLIDS | | | 50 | 200 | |
| Slurry density | % w/w | 200 | 3.185 | 50 | 50 |
| Initial mass | g (dry) | 3.185 | 6.37 | 881 | 1800 |
| Initial concentration of As | % w/w | 6.37 | 0.085 | 1.123 | 0.826 |
| Initial mass of As | g | 0.085 | 170 | 9.89 | 14.86 |
| Initial moles of As | mol | 182 | 0.141 | 0.132 | 0.198 |
| Final mass | g (dry) | 0.130 | 0.24 | 868 | 1694 |
| Final concentration of As | % w/w | 0.24 | 0.003 | 0.041 | 0.118 |
| Final mass of As | g | 0.003 | 96.23 | 0.36 | 1.99 |
| Final moles of As | mol | 96.29 | 91.68 | 0.005 | 0.027 |
| ARSENIC REMOVAL | % | 90.96 | | 96.38 | 86.59 |
| | | | 220 | | |
| SOLUTION | | 220 | 0 | | |
| Initial NaOH | g/L | 0 | 168 | 220 | 220 |
| Initial Na2S | g/L | 172 | 0 | 24 | 0 |
| Initial volume | mL | 0 | 0 | 745 | 1460 |
| Initial sulphide | g | 0 | 0 | 18.14 | 0 |
| Initial sulphide | mol | 0 | | 0.566 | 0 |
| Molar ratio (S:As) | | | | 4.3 | 0 |
| | | | 3.18 | | |
| Kinetic As in solids | % w/w | 3.18 | | | |
| 0 | hr | | 1.62 | 1.12 | 0.83 |
| 2 | hr | 2.19 | 0.80 | | |
| 4 | hr | 1.09 | 0.34 | | 0.16 |
| 8 | hr | 0.33 | | 0.04 | 0.15 |
| 14 | hr | | 0.14 | | |
| 20 | hr | 0.13 | | | |
| 24 | hr | | | | 0.12 |

In Table 4, example 16 is a comparative example.

Further closed circuit tests were conducted using recyled leach solution. The results are shown in Table 5.

TABLE 5

| Test | # | 18 | 19 | 20 | 21 | 22 |
|---|---|---|---|---|---|---|
| Grind size, p80 | mm | 15 | 16 | 15 | 15 | 16 |
| Residence time | hr | 8 | 16 | 16 | 16 | 16 |
| SOLIDS | | | | | | |
| Slurry density | % w/w | 48 | 53 | 49 | 49 | 53 |
| Initial mass | g (dry) | 1367 | 1482 | 1349 | 1349 | 1518 |
| Initial concentration of As | % w/w | 1.075 | 1.161 | 1.275 | 1.275 | 1.181 |
| Initial mass of As | g | 14.69 | 17.20 | 17.19 | 17.19 | 17.94 |
| Initial moles of As | mol | 0.196 | 0.230 | 0.229 | 0.229 | 0.239 |
| Final mass | g (dry) | 1364 | 1464 | 1268 | 1268 | 1459 |
| Final concentration of As | % w/w | 0.052 | 0.058 | 0.131 | 0.131 | 0.132 |
| Final mass of As | g | 0.71 | 0.84 | 1.66 | 1.66 | 1.92 |
| Final moles of As | mol | 0.009 | 0.011 | 0.022 | 0.022 | 0.026 |
| ARSENIC REMOVAL | % | 95.17 | 95.09 | 90.34 | 90.34 | 89.29 |
| Initial concentration of Sb | % w/w | | | 0.106 | 0.106 | |
| Initial mass of Sb | g | | | 1.43 | 1.43 | |
| Initial moles of Sb | mol | | | 0.012 | 0.012 | |
| Final concentration of Sb | % w/w | | | 0.034 | 0.034 | |
| Final mass of Sb | g | | | 0.43 | 0.43 | |
| Final moles of Sb | mol | | | 0.003 | 0.003 | |
| ANTIMONY REMOVAL | % | | | 70.19 | 70.19 | |
| SOLUTION | | | | | | |
| Recycled volume | mL | 0 | 0 | 520 | 520 | 520 |
| NaOH | g/L | 0 | 0 | 180 | 180 | 124 |
| Na$_2$S | g/L | 0 | 0 | 34 | 34 | 38 |
| Recycled sulphide | g | 0 | 0 | 7 | 7 | 8 |
| Recycled sulphide | mol | 0 | 0 | 0 | 0 | 0 |
| Make-up volume | mL | 1270 | 1210 | 690 | 690 | 690 |
| NaOH | g/L | 241 | 185 | 279 | 279 | 222 |
| Na$_2$S | g/L | 24 | 24 | 0 | 0 | 0 |
| Make-up sulphide | g | 12.70 | 11.98 | 0.00 | 0.00 | 0.00 |
| Make-up sulphide | mol | 0.396 | 0.374 | 0.000 | 0.000 | 0.000 |
| Initial volume | mL | 1270 | 1210 | 1210 | 1210 | 1210 |
| Initial NaOH | g/L | 241 | 241 | 241 | 241 | 241 |
| Initial Na$_2$S | g/L | 24 | 24 | 14 | 14 | 19 |
| Initial sulphide | g | 12.70 | 11.98 | 7.02 | 7.02 | 9.44 |
| Initial sulphide | mol | 0.396 | 0.374 | 0.219 | 0.219 | 0.294 |
| Molar ratio (S$^2$:As) | | 2.02 | 1.63 | 0.95 | 0.95 | 1.23 |

TABLE 5-continued

| Test | # | 23 | 24 | 25 | 26 | 27 |
|---|---|---|---|---|---|---|
| Grind size, p80 | mm | 15 | 15 | 16 | 16 | 15 |
| Residence time | hr | 16 | 16 | 16 | 16 | 16 |
| SOLIDS | | | | | | |
| Slurry density | % w/w | 51 | 49 | 53 | 51 | 49 |
| Initial mass | g (dry) | 1535 | 1367 | 1568 | 1510 | 1423 |
| Initial concentration of As | % w/w | 1.111 | 1.110 | 1.132 | 1.164 | 1.060 |
| Initial mass of As | g | 17.06 | 15.17 | 17.74 | 17.58 | 15.08 |
| Initial moles of As | mol | 0.228 | 0.203 | 0.237 | 0.235 | 0.201 |
| Final mass | g (dry) | 1505 | 1314 | 1519 | 1464 | 1375 |
| Final concentration of As | % w/w | 0.051 | 0.171 | 0.181 | 0.095 | 0.154 |
| Final mass of As | g | 0.78 | 2.25 | 2.75 | 1.39 | 2.12 |
| Final moles of As | mol | 0.010 | 0.030 | 0.037 | 0.019 | 0.028 |
| ARSENIC REMOVAL | % | 95.46 | 85.19 | 84.52 | 92.07 | 85.95 |
| Initial concentration of Sb | % w/w | 0.056 | 0.098 | | 0.059 | 0.096 |
| Initial mass of Sb | g | 0.87 | 1.33 | | 0.90 | 1.36 |
| Initial moles of Sb | mol | 0.007 | 0.011 | | 0.007 | 0.011 |
| Final concentration of Sb | % w/w | 0.010 | 0.036 | | 0.010 | 0.033 |
| Final mass of Sb | g | 0.16 | 0.48 | | 0.14 | 0.46 |
| Final moles of Sb | mol | 0.001 | 0.004 | | 0.001 | 0.004 |
| ANTIMONY REMOVAL | % | 82.05 | 64.12 | | 83.92 | 66.29 |
| SOLUTION | | | | | | |
| Recycled volume | mL | 520 | 520 | 520 | 520 | 520 |
| NaOH | g/L | 170 | 188 | 104 | 148 | 204 |
| $Na_2S$ | g/L | 49 | 27 | 35 | 34 | 28 |
| Recycled sulphide | g | 11 | 6 | 7 | 7 | 6 |
| Recycled sulphide | mol | 0 | 0 | 0 | 0 | 0 |
| Make-up volume | mL | 690 | 690 | 690 | 690 | 690 |
| NaOH | g/L | 257 | 279 | 222 | 257 | 279 |
| $Na_2S$ | g/L | 0 | 0 | 0 | 0 | 0 |
| Make-up sulphide | g | 0.00 | 0.00 | 0.00 | 0.00 | 0.00 |
| Make-up sulphide | mol | 0.000 | 0.000 | 0.000 | 0.000 | 0.000 |
| Initial volume | mL | 1210 | 1210 | 1210 | 1210 | 1210 |
| Initial NaOH | g/L | 220 | 241 | 241 | 220 | 241 |
| Initial Na2S | g/L | 21 | 11 | 20 | 16 | 13 |
| Initial sulphide | g | 10.32 | 5.71 | 9.76 | 7.99 | 6.40 |
| Initial sulphide | mol | 0.322 | 0.178 | 0.305 | 0.249 | 0.200 |
| Molar ratio ($S^2$:As) | | 1.41 | 0.88 | 1.29 | 1.06 | 0.99 |

| Test | # | 28 | 29 | 30 | 31 | 32 |
|---|---|---|---|---|---|---|
| Residence time | hr | 16 | 16 | 16 | 16 | 16 |
| SOLIDS | | | | | | |
| Slurry density | % w/w | 53 | 51 | 49 | 53 | 51 |
| Initial mass | g (dry) | 1527 | 1522 | 1433 | 1565 | 1497 |
| Initial concentration of As | % w/w | 1.082 | 1.161 | 1.150 | 1.037 | 1.177 |
| Initial mass of As | g | 16.52 | 17.67 | 16.48 | 16.22 | 17.62 |
| Initial moles of As | mol | 0.220 | 0.236 | 0.220 | 0.217 | 0.235 |
| Final mass | g (dry) | 1494 | 1473 | 1321 | 1540 | 1447 |
| Final concentration of As | % w/w | 0.144 | 0.114 | 0.073 | 0.226 | 0.087 |
| Final mass of As | g | 2.14 | 1.68 | 0.96 | 3.47 | 1.26 |
| Final moles of As | mol | 0.029 | 0.022 | 0.013 | 0.046 | 0.017 |
| ARSENIC REMOVAL | % | 87.02 | 90.51 | 94.15 | 78.59 | 92.83 |
| Initial concentration of Sb | % w/w | | 0.065 | 0.098 | | 0.060 |
| Initial mass of Sb | g | | 0.99 | 1.41 | | 0.90 |
| Initial moles of Sb | mol | | 0.008 | 0.012 | | 0.007 |
| Final concentration of Sb | % w/w | | 0.010 | 0.017 | | 0.012 |
| Final mass of Sb | g | | 0.15 | 0.23 | | 0.17 |
| Final moles of Sb | mol | | 0.001 | 0.002 | | 0.001 |
| ANTIMONY REMOVAL | % | | 84.52 | 83.68 | | 80.55 |
| SOLUTION | | | | | | |
| Recycled volume | mL | 520 | 520 | 520 | 520 | 520 |
| NaOH | g/L | 112 | 136 | 184 | 104 | 128 |
| $Na_2S$ | g/L | 36 | 36 | 29 | 34 | 27 |
| Recycled sulphide | g | 8 | 8 | 6 | 7 | 6 |
| Recycled sulphide | mol | 0 | 0 | 0 | 0 | 0 |
| Make-up volume | mL | 690 | 690 | 690 | 690 | 690 |
| NaOH | g/L | 222 | 257 | 279 | 222 | 257 |
| $Na_2S$ | g/L | 0 | 0 | 0 | 0 | 0 |
| Make-up sulphide | g | 0.00 | 0.00 | 0.00 | 0.00 | 0.00 |
| Make-up sulphide | mol | 0.000 | 0.000 | 0.000 | 0.000 | 0.000 |
| Initial volume | mL | 1210 | 1210 | 1210 | 1210 | 1210 |

TABLE 5-continued

| | | | | | | |
|---|---|---|---|---|---|---|
| Initial NaOH | g/L | 241 | 220 | 241 | 241 | 220 |
| Initial Na$_2$S | g/L | 20 | 17 | 12 | 19 | 14 |
| Initial sulphide | g | 9.81 | 8.41 | 6.09 | 9.47 | 7.07 |
| Initial sulphide | mol | 0.306 | 0.262 | 0.190 | 0.295 | 0.220 |
| Molar ratio (S$^2$:As) | | 1.39 | 1.11 | 0.86 | 1.36 | 0.94 |

Embodiments of the present invention provide a method for removing arsenic from solid sulphide containing material that does not require that the starting leach solution that is fed to the leaching step contains Na$_2$S in an amount that is in stoichiometric excess to the amount required to react with and remove the arsenic present in the solid sulphide material. This is a surprising result that is completely at odds to conventional knowledge in this art, which required a significant stoichiometric excess of Na$_2$S to ensure satisfactory removal of arsenic in commercially acceptable timeframes. In consequence of the present invention, the operating costs of the leaching circuit can be significantly reduced as a reduced quantity of Na$_2$S is required to be fed to the leaching step in the starting leaching solution or in any make up leaching solution fed to the leaching step.

The present invention provides a method for selectively removing arsenic from solid sulphide materials that contain arsenic. The method may also selectively remove antimony that may also be contained in the sulphide materials. Metals such as copper, zinc, lead, gold, silver, platinum group metals, cobalt and nickel remain for the most part in the residue from the leach.

Those skilled in the art will appreciate that the present invention may be susceptible to variations and modifications other than those specifically described. It will be understood that the present invention encompassed all such variations and modifications that fall within its spirit and scope.

What is claimed is:

1. A method for selectively removing arsenic from a sulphide material containing arsenic, the method comprising the steps of conducting a leaching step comprising contacting the material with a leaching solution that leaches arsenic from the material to form a pregnant liquor containing dissolved arsenic and a solid comprising a sulphide material of reduced arsenic content, and subsequently separating the solid from the pregnant liquor, wherein a leaching solution that is provided to the leaching step comprises an alkaline solution having a sulphide-containing compound present in an amount that is less than the stoichiometric amount of sulphur containing compound required to react with the arsenic present in the material.

2. A method as claimed in claim 1 wherein a recycle solution is provided to the leaching step.

3. A method as claimed in claim 2 wherein the recycle solution has a sulphide-containing compound present in an amount less than the stoichiometric amount of sulphur containing compound required to react with the arsenic present in the material.

4. A method as claimed in claim 2 wherein the amount of sulphide containing compounds present in the recycle solution results in a molar ratio of S$^{2-}$/As of 0 to less than 1.5 being obtained.

5. A method as claimed in claim 1 wherein the leach solution contains no sulphide compounds.

6. A method as claimed in claim 1 wherein the leaching solution provided to the contacting step has at least 8 moles of alkaline material (calculated as equivalent OH$^-$) for each mole of As present.

7. A method as claimed in claim 1 wherein the leaching solution includes sodium hydroxide present in a concentration of from 1.75 moles to 6.25 moles per liter.

8. A method as claimed in claim 1 wherein the leaching step is conducted at a temperature of from 30° C. up to the boiling point of the solution or slurry and a slurry of solid material and leaching solution formed in the leaching step has a solid content in the range of 5 to 90% w/w.

9. A method as claimed in claim 8 wherein the leaching step is conducted at a pressure above atmospheric pressure and the temperature utilised in the leaching step is above 100° C.

10. A method as claimed in claim 1 wherein the sulphide material containing arsenic also contains antimony and the method reduces the level of both arsenic and antimony.

11. A method as claimed in claim 1 wherein the leaching step comprises an open circuit leaching process, or the leaching step comprises a leaching circuit that includes leach solution recycling.

12. A method for selectively removing arsenic from a sulphide material containing arsenic, the method comprising the steps of conducting a leaching step comprising contacting the material with a leaching solution that leaches arsenic from the material to form a leach solution containing dissolved arsenic and a solid comprising a sulphide material of reduced arsenic content, the leaching solution that is provided to the leaching step comprising an alkaline solution having a sulphide-containing compound present in an amount that is less than the stoichiometric amount of sulphur containing compound required to react with the arsenic present in the material, separating the solid from the pregnant liquor, and recycling at least part of the leach solution to the leaching step.

13. A method as claimed in claim 12 wherein the leach solution that is recycled to the leaching step contains one or more dissolved sulphide-containing compounds.

14. A method as claimed in claim 13 wherein the one or more dissolved sulphide-containing compounds are present in the leach solution that is recycled to the leaching step in an amount less than the stoichiometric amount of sulphur containing compound required to react with the arsenic present in the material.

15. A method as claimed in claim 12 wherein the leaching solution that is fed to the leaching step contains no sulphide containing compounds.

16. A method as claimed in claim 13 wherein the solid material contains antimony and the method also removes antimony from the solid material.

17. A method for selectively removing antimony from a sulphide material containing antimony, the method comprising the steps of conducting a leaching step comprising contacting the material with a leaching solution that leaches antimony from the material to form a pregnant liquor containing dissolved antimony and a solid comprising a sulphide material of reduced antimony content, and subsequently separating the solid from the pregnant liquor, wherein a leaching solution that is provided to the leaching step comprises an alkaline solution having a sulphide-containing compound present in an amount less than the stoichiometric amount of sulphur containing compound required to react with the antimony present in the material.

18. The method of claim 17, wherein the leaching solution is a leaching solution which after contacting the material forms a pregnant liquor that includes the leach solution, and the method further comprises separating solids from the pregnant liquor and recycling at least part of the leach solution to the leaching step.

19. The method of claim 18, wherein at least 30 to 80% of the leach solution is recycled to the leaching step.

\* \* \* \* \*